UNITED STATES PATENT OFFICE.

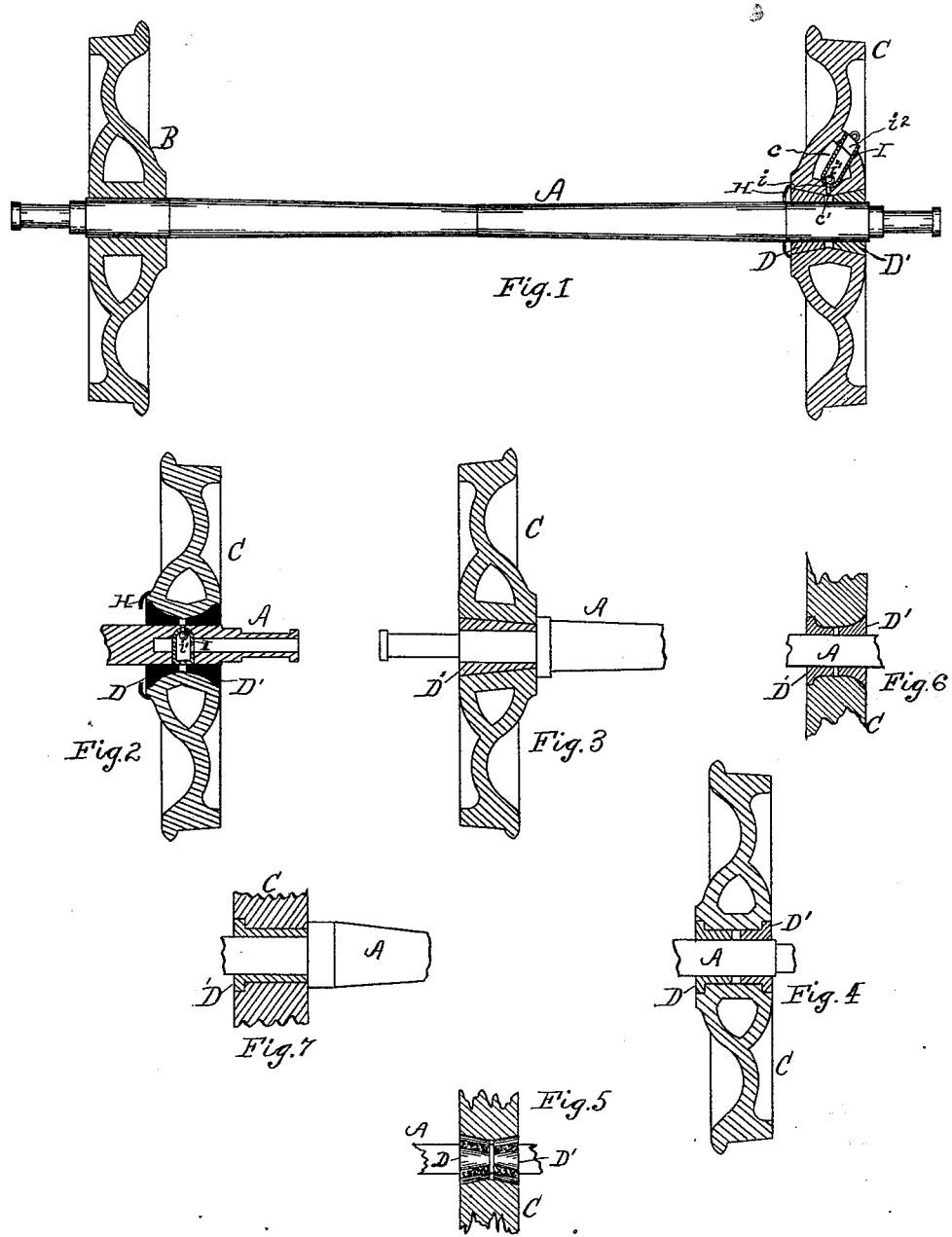

GEORGE F. GODLEY, OF PHILADELPHIA, PENNSYLVANIA.

IMPROVEMENT IN CAR-WHEELS.

Specification forming part of Letters Patent No. 218,254, dated August 5, 1879; application filed March 20, 1879.

*To all whom it may concern:*

Be it known that I, GEORGE F. GODLEY, of the city and county of Philadelphia, and State of Pennsylvania, have invented certain new and useful Improvements in Railway-Car Wheels; and I do hereby declare the following to be a full, clear, and exact description of the invention, such as will enable others skilled in the art to which it pertains to make and use it, reference being had to the accompanying drawings, which form part of this specification, in which—

Figure 1 is a longitudinal vertical section of my invention; and Figs. 2, 3, 4, 5, 6, and 7 show vertical sections of modified forms of sleeves and axles.

The object of my invention is to secure a cheap, reliable, and durable loose car wheel or wheels, which will admit of the retention, as near as practicable, of the present mode of construction, appliances, and sizes of the two fixed wheels and axle.

My invention accordingly consists in placing the loose wheel upon a sleeve or sleeves, which are permanently and rigidly secured upon the axle, said sleeves serving as a bearing for the wheel to revolve upon, and also forming the sole means for retaining said wheel in position to prevent it from moving laterally.

My invention further consists in the provision of means for effecting the proper lubrication of the bearings of the loose wheel, and to the provision of a dust-shield secured to the loose wheel, for the purpose of excluding the dust and dirt from said wheel-bearings.

Referring to the accompanying drawings, A is the axle; B, the fixed wheel, placed thereon in the usual way, and C is the loose wheel. D is a sleeve which is forced upon the axle under a heavy pressure, so as to be immovably fixed thereon; or, if desired, it may be formed integral with the axle.

The wheel C is now placed in position on the sleeve D, and another sleeve, D', is then in like manner forced upon the axle. The exterior surfaces of said sleeves and the bore of the hub are turned so that when placed in position they will snugly fit upon each other without lost motion.

The sleeves D D' may be made conical in form, as shown in Fig. 1, or they may be modified to conform to the shape of those shown in Figs. 2, 3, 4, 5, 6, and 7, said differences in configuration resulting from the use of different forms of standard axles.

For the purpose of lubricating the bearing-surfaces of the wheel C, I employ means shown in Fig. 1, wherein the solid standard axis is represented, wherein $c$ is a recess formed in the wheel, and communicates by means of a channel, $c'$, with the bearings of the wheel. In said recess is inserted a tube, I, having an opening or openings, $i$. $i^1$ is a ball-valve of suitable size placed within said tube, and having its seat in the opening $i$.

The tube I is filled with oil, which is held therein by the stopple $i^2$. The revolution of the wheel causes the ball $i^1$ to recede from its seat, thereby allowing sufficient oil to pass through the opening $i$ to the channel $c'$ to lubricate the bearings of the wheel C.

Where a tubular axle is employed, as shown in Fig. 2, the pipe I can be inserted in said axle, as shown, and the bearings will be oiled from the axle instead of from the wheel.

Instead of oil, plumbago and tallow may be used, the latter being placed in grooves cut in the sleeves or bore of the wheel, as shown in Fig. 5; or a layer of the same may be placed between said bearing-surfaces.

H is an annular ring, of leather, rubber, or other equivalent material, secured to the hub on the rear side of the loose wheel C, and which projects down over the edge of the sleeve D, thereby providing a shield which excludes all dust and dirt from entering the bearing-surfaces between said sleeves and wheel.

The operation is plainly seen. The fixed wheel causes the axle to revolve in its bearings, carrying with it the loose wheel C, until an unevenness in the track or a curve is met, when said wheel C will, under the variations thereby produced, revolve independently of the axle on the sleeves D D', thereby avoiding all torsional strain on the axle and hugging or slipping of the wheel on the rails.

The advantages of said construction are, that the standard-size axles and wheels now used are retained and employed without making any deviation therefrom.

All that is required is to turn the bore of the loose wheel to correspond with the shape of the exterior surfaces of the sleeves, and the latter with the loose wheel can be forced upon the axle at one operation, the same as if it were a fixed wheel.

The construction of the sleeves is such that they not only form bearings for the loose wheel, but also retain the latter in position to prevent any lateral movement of the same, thereby dispensing with the aid of collars, jam-nuts, or other fastening devices, while the ample provision made for oiling the bearings of the loose wheel, and for excluding all dust therefrom, makes the whole device efficient and practical in operation, simple in construction, and durable for lengthened use.

I am aware that sleeves have been placed upon car-axles to form a bearing for the loose wheel; but in such cases the axle is a non-revolving axle, and such construction forms no part of my invention; but

What I claim as my invention is—

1. A railroad-car axle capable of revolving in journal-bearings, and provided with a loose wheel, which is mounted upon sleeve or sleeves, the latter being permanently and rigidly secured, either by pressure or shrinkage, to said axle, so as to become an integral part thereof and revolving therewith, said sleeve or sleeves forming the bearing for the loose wheel to revolve upon, and also the sole means for retaining the wheel in position to prevent lateral movement of said wheel, substantially as shown and described, whereby said wheel revolves rigidly with the axle under ordinary pressure, as when traveling over a straight track, and revolving independently of said axle on the said sleeves under undue pressure, as when turning curves or going over variations on a straight track, substantially as set forth.

2. The combination of the axle A, fixed wheel B, loose wheel C, and sleeve or sleeves D D', immovably secured by pressure or shrinkage to said axle, so as to form an integral part thereof and revolve therewith, said sleeves also serving as bearing-surfaces for the loose wheel to revolve upon and to retain the same in position, as shown and described, and for the purpose set forth.

3. The combination, with axle A, sleeve or sleeves D D', and loose wheel C, of the oil-supply cup or tube I, inserted in said wheel or axle, and provided with a valve, $i$, substantially as shown and described.

4. The combination of axle A, wheel C, sleeve or sleeves D D', and flexible dust-shield H, affixed to said loose wheel or axle, substantially as shown and described, and for the purpose set forth.

In testimony that I claim the foregoing I have hereunto set my hand this 13th day of March, 1879.

GEORGE F. GODLEY.

Witnesses:
 J. R. MASSEY,
 GEO. BETHMORE ADAMS.